(12) United States Patent
Kim Brillouet et al.

(10) Patent No.: US 7,806,128 B2
(45) Date of Patent: Oct. 5, 2010

(54) NO WATER SPILL AUTOMATIC STEAM CAR WASH SYSTEM

(76) Inventors: Yong Chu Kim Brillouet, 16215 Vista Point La., Canyon Country, CA (US) 91387; Pierrick Brillouet, 16215 Vista Point La., Canyon Country, CA (US) 91387

( * ) Notice: Subject to any disclaimer, the term of this patent is extended or adjusted under 35 U.S.C. 154(b) by 542 days.

(21) Appl. No.: 11/986,631

(22) Filed: Nov. 26, 2007

(65) Prior Publication Data
US 2009/0133728 A1 May 28, 2009

(51) Int. Cl.
*B08B 3/04* (2006.01)
(52) U.S. Cl. ................... 134/123; 134/172; 134/179; 134/184; 134/198
(58) Field of Classification Search ............. 134/123
See application file for complete search history.

(56) References Cited

U.S. PATENT DOCUMENTS 5,588,176 A * 12/1996 Sixsmith ................. 15/322
2002/0121291 A1 * 9/2002 Daum et al. ................. 134/8
2004/0079402 A1 * 4/2004 Shin ..................... 134/123

* cited by examiner

*Primary Examiner*—Michael Barr
*Assistant Examiner*—Jason Y Ko (57) ABSTRACT

An automatic steam car washing system is provided. The automatic steam car washing system according to current application is comprised of a moving station and 10 metal beams that comprise a frame. Car to be washed stays inside of the frame. Pluralities of steam spraying nozzles, a vacuum nozzle, and a towel are installed in a moving station and moves along the surface of the car. Pluralities of steam generators are installed inside of the moving station and connected to the steam spraying nozzles. Tip of the steam spraying nozzle oscillates horizontally with an angle to the surface of the car. The distance between the spraying nozzle and the surface of the car is maintained constant irrespective of the surface geometry. The automatic steam car washing system according to current application realize a no water spill automatic car washing system and protects the air by collecting the dusts that comes out from the contaminated car surface. By making a steam car wash system automatic, it also protects workers from contaminated working environment. No detergent is used.

2 Claims, 13 Drawing Sheets

NO WATER SPILL AUTOMATIC STEAM CAR WASH SYSTEM

FIELD OF THE INVENTION

The current application relates to an automatic car wash system, especially to an automatic car wash system utilizing hot steam of temperature above 120° C., 2 atm and below 180° C., 10 atm.

BACKGROUND OF THE INVENTION

The most common washing system these days is the tunnel-type car wash system wherein a vehicle to be washed is passed through a series of linearly spaced cleaning stations. In conventional tunnel-type wash systems, mitter curtains, which are comprised of strips of cloth that are rocked back and forth transversely across the path of the vehicle, abrasively scrub dirt and other debris from the surface of the vehicle. In combination with a mitter curtain, revolving brushes may rotatably engage the surface of the vehicle. In either case, the vehicle surface may be scratched by contact with granular dirt particles that may have collected on the mitter curtains or brushes, and/or may contact with the brushes or curtains themselves. Some "brushing less car washing system" sprays clean exterior surfaces of a vehicle with pressurized fluid jets, usually pressurized water with detergent, that are passed adjacent to the surface of the vehicle. In any case, the object is to submit the entire readily visible exterior surface of the vehicle to the spray jets to remove dirt and grease from the vehicle surface. However, there is a limit of pressure that can be applied to the surface of the vehicle due to the cost of compressing the liquid and the possibility of damaging the surface of the vehicle. Anyway, all the conventional automatic car washing systems use water and detergent to remove dirt from the surface of the vehicle to be washed.

Some waterless cleaning chemical solutions are introduced to the market. Those chemicals are applied to the surface of a car by hand. Manufacturers of those chemicals claim that they are environmentally affirmative because they are bio-degradable. However, it is clear that even bio-degradable chemicals need time to be decomposed by any kind of outer source, such as bacteria or micro-organism. Before it is decomposed it remains as just a chemical. And there is no final result what the decomposed chemicals may produce.

Recently, a portable steam generator that produces hot steam of pressure between 1 Kg to 10 Kg is introduced for "hand car washing." That steam generator uses less than 10% amount of water that was needed to wash a car by conventional automatic car washing systems that use water and detergent. Moreover, the steam cleaning method does not use any kind of detergent. It means no waste water is generated.

In spite of the above benefits, those portable steam generators have critical defects.

First is that the end of the hot steam exit nozzle is exposed to the air without any proper protections. Most of the portable steam generators for car wash have one or two long flexible rubber hose equipped with a nozzle and used for "hand wash." Such design is to maximize the pressure of the steam that is applied on the surface of the car to be washed and to wash indented surface of a car. However, the hot temperature of the exiting steam, which is well over 100° C., may burn the skin of a person who accidentally stands in front of the steam exit nozzle. Inexperienced user easily burns their skins. Second is that when the high pressure steam washes the dirty surface of a car, the steam blows away the dirt from the surface of the car to the air. Then a user, usually look into the surface of the car carefully, put his/her face close to the surface. Then the mist of the steam and the dirt blows into the air and the user inhale them as he/she breaths. This is very bad working environment for the user or employers.

It is the purpose of the current application to provide a car washing system that is not only environmentally affirmative but also friendly to industrial hygiene.

DESCRIPTION OF THE PRIOR ART

U.S. Patent Application publication 20060107486 by Andre; Scott E. and U.S. Patent Application Publication No. 20060011220 to Mueller; Barbara A. illustrate automatic cart wash apparatus. They are automatic cart washing system with water.

U.S. Patent Application Publication 20040217183 to Bae, Sang Gyoon; et al. illustrates a low pressure and low temperature steam cleaner for washing vehicles. It describes a method of washing car with low pressure steam generator.

U.S. Patent Application Publications 20040149316, 20020162576, 2002 162575, U.S. Pat. Nos. 7,056,390, 6,863, 739, 6,807,973, and 6,283,135 to Fratello, et al. illustrates an automatic vehicle washing system that utilizing high pressure fluid jet and incorporates an elongated overhead cleaning platform for cleaning the front, top and rear surfaces of a vehicle. It is "brushless car washing system" to prevent scratches by mitter and to save expensive waxing solutions.

U.S. Pat. No. 7,045,021 to Ewing, et al. illustrates a customizable car wash blending and method is provided. This invention is customized car washing method based on water car wash. U.S. Pat. No. 5,575,852 to Chase illustrates a manifold which includes a foam generating zone having means for receiving a foamable solution and air there through to produce foam. This invention is based on water car wash too. U.S. Pat. No. 5,413,128 to Butts illustrates a personal automatic car wash, which includes an enclosure for the car. A movable fluid dispensing assembly is mounted on a track in the enclosure so that fluids can be dispensed to the surfaces of a stationary car situated within the enclosure. This invention is water car wash too. U.S. Pat. No. 5,886,648 to McElroy, et al. illustrates an automated car wash system includes a device for recognizing the types of vehicles passing through the system. This invention is applicable to any kind of washing method. U.S. Pat. No. 5,730,061 to Stufflebeam illustrates a guide rail assembly for use with a conveyor of an automatic conveyor car wash. U.S. Pat. No. 5,189,754 to Sauter illustrates an air distribution system of a car wash air blower system.

U.S. Pat. No. 5,160,430 to Gasser, et al. illustrates a rollover type car wash and rinse machine. The machine is operator controlled to wash and initially rinse cars with spray arch using raw water and concentrate from the reverse osmosis unit. U.S. Pat. No. 5,148,570 to Crotts, et al. illustrates a car washing system having mitter curtains which are constructed and manipulated in a manner providing effective washing action over the entire vehicle surface during the wash cycle. U.S. Pat. No. 5,040,485 to Bailey, et al. illustrates an automatic car wash system comprised of a linear trolley suspended from the upper structure of a car wash building and a cross trolley transversely mounted thereto. U.S. Pat. No. 4,995,136 to Smith illustrates automatic car wash equipment for positioning a forced air dryer including a blower towards vehicles being washed. U.S. Pat. No. 4,981,523 to Larson, et al. illustrates a fluid distribution apparatus which includes a sensor for developing control signals representative of the profile of a vehicle to be cleaned and a tube for distributing fluid. U.S. Pat. No. 4,977,689 to Belanger, et al. illustrates an accessory of an automobile wash system in being positioned accurately with respect to a particular automobile's width. U.S. Pat. No. 4,955,405 to Glick, et al. illustrates a system and method for constructing a car wash which involves prefabricating a raceway equipped with lines and hoses for delivering car wash supplies to car washing equipment. U.S. Pat. No. 4,946,513 to Del Prato, et al. illustrates an automated system and method for washing automobiles. The invention provides a device which sprays liquid onto the vehicle, while closely following the general contour of the vehicle. U.S. Pat. No. 4,893,229 to Detrick illustrates a computerized car wash controls a plurality of washing and waxing devices for cars. U.S. Pat. No. 4,424,823 to Gougoulas illustrates an apparatus for automatically spray cleaning tires on vehicles moving along automatic car wash lines. U.S. Pat. No. 4,166,303 to Fromme illustrates a dry wiping system for use in a mechanized car wash establishment in which an automobile moves along a defined path comprises a series of strips of water absorbent material suspended from a carrier above the path of the automobile. U.S. Pat. No. 4,726,388 to Swinehart, et al. illustrates equipment for automatically washing a vehicle as it is being moved by a conveyor through a treatment area. U.S. Pat. No. 4,719,932 to Burton illustrates an automatic vehicle washing apparatus. The apparatus comprises a single support column, a boom assembly cantileverly supported on and hinged to pivot horizontally about the support column and mounted to move up and down on the support column. U.S. Pat. No. 4,462,133 to Hanna illustrates a vehicle washing apparatus includes vertically extending curtain-like washing elements suspended from an overhead support structure. U.S. Pat. No. 3,822,430 to Larson illustrates a vehicle washer utilizing a shortened track for the frame carrying the washing elements such as nozzles and/or brushes. U.S. Pat. No. 3,795,929 to Thompson illustrates an apparatus for washing a stationary vehicle. A mobile carriage travels along a longitudinal path over the vehicle. U.S. Pat. No. 3,793,663 to Lieffring illustrates a vehicle washing apparatus having a supporting structure over a vehicle wash position in which a vehicle is parked during washing operations.

None of the prior art illustrates a car wash system that is not only environmentally affirmative but also friendly to industrial hygiene and economical.

BRIEF DESCRIPTION OF THE DRAWINGS

FIG. 4-a is a side view of an oscillating steam spraying nozzle and its' height adjustable supporting rod for the no water spill automatic steam car wash system according to current application.

FIG. 4-b is a front view of an oscillating steam spraying nozzle and its' height adjustable supporting rod for the no water spill automatic steam car wash system according to current application.

DETAILED DESCRIPTION OF THE PREFERRED EMBODIMENT

Figure 1:
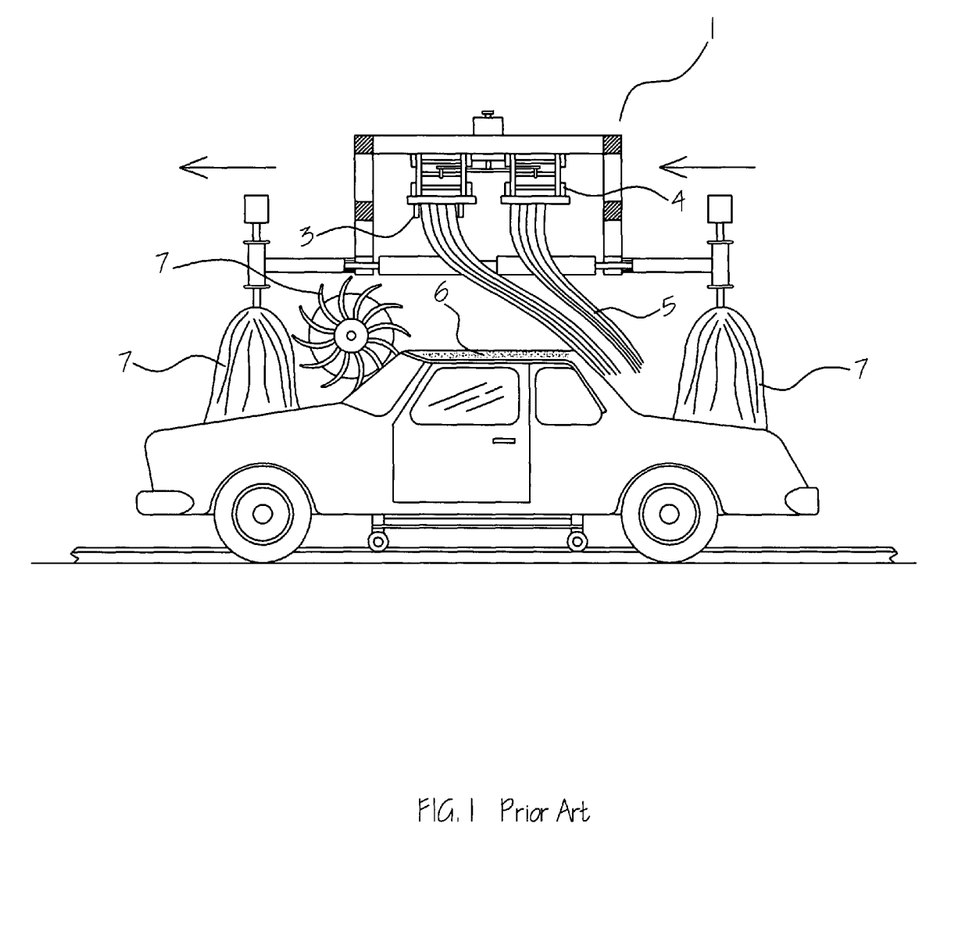
FIG. 1 is a conventional automatic water car washing system of prior art.

FIG. 1 is a conventional automatic water car washing system (1) of prior art. In the prior art, a car (2) is in a stationary mode. Instead the washing system (1) proceeds from one side to the other side. In the first step, soap water is sprayed to the car (2) from nozzles (3) located above structure (4) and other nozzles (3') installed on the side of the car washing system. Then the mitter curtain (5) scrubs the upper surface of the car. At this moment, the dirt (6), which is mixture of fine inorganic particles and oily organic material, are dissolved in the soap water and the fine inorganic particles are dispersed in the soap water. However, the fine inorganic particles still remain on the surface of the car (2). So, the scrubbing motion of the mitter curtain (5) helps the inorganic particles make fine scratches on the surface of the car (2). More specifically, the fine particles scratch the wax layer and paint of the car. Especially, the fast turning brushes (7) damages the car's surface when some dirt is stick to the feather of the brush (7). Hand washing is introduced to avoid such damages done by automatic car washing machines. But, still automatic water car washing is time effective and economical as far as the amount of waste water is not concerned.

Recently, a portable steam generator that produces hot steam of pressure between 1 Kg to 10 Kg is introduced for "hand car washing." That steam generator uses less than 10% amount of water that was needed to wash a car by conventional automatic car washing systems that use water and detergent. Moreover, the steam cleaning method does not use any kind of detergent. It means no waste water is generated. In spite of the above benefits, those portable steam generators have critical defects. First, the end of the hot steam exit nozzle is exposed to the air without any proper protections. The temperature of the exiting steam, which is well over 100° C., may burn the skin of a person who accidentally stands in front of the steam exit nozzle. Second, when the high pressure steam washes the dirty surface of a car, the steam blows away the dirt from the surface of the car to the air. Then the mist of the steam and the dirt blows into the air and the user inhale them as he/she breaths. This is very bad working environment for the user or employers. It is the purpose of the current application to provide a car washing system that is not only environmentally affirmative but also friendly to industrial hygiene. Another purpose of the current application is to provide an automatic steam car washing system with minimum adjustment of the existing water car washing systems.

Figure 2:
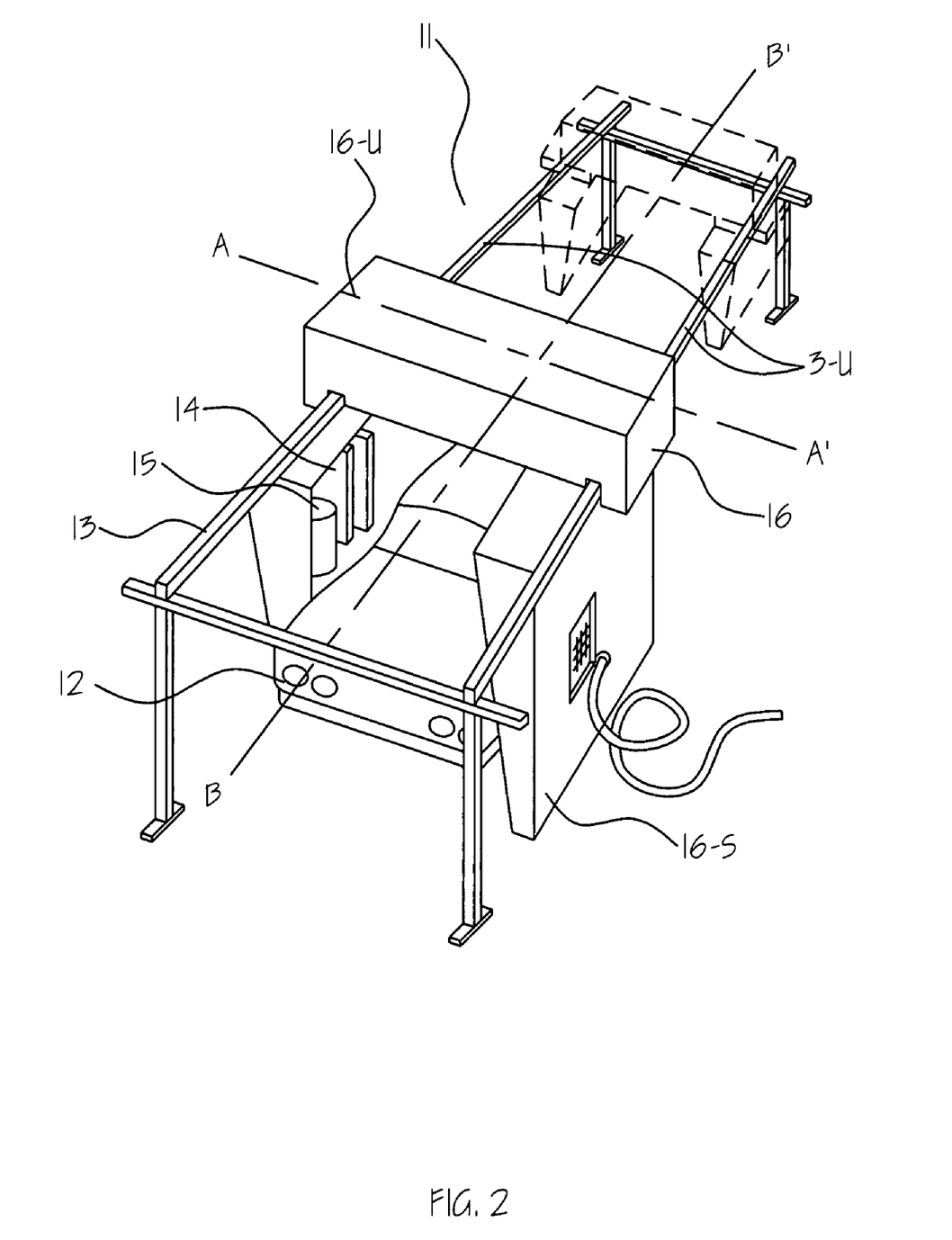
FIG. 2 is a perspective of a no water spill automatic steam car wash system according to current application.

FIG. 2 is a perspective of a no water spill automatic steam car wash system (11) according to current application. The automatic steam car wash system (11) is a moving station system, wherein a car (12) to be washed is in a stationary mode in a frame (13) that is comprised of 10 metal beams. Four sides (front, rear, left and right side) of the frame (13) are covered with transparent blade curtain to monitor the inside of the frame (13).

Steam spraying nozzles (22), vacuum nozzle (14), and towels (15), which is installed in a moving station (16), moves along the surface of the car (12) to wash it.

Figure 3:
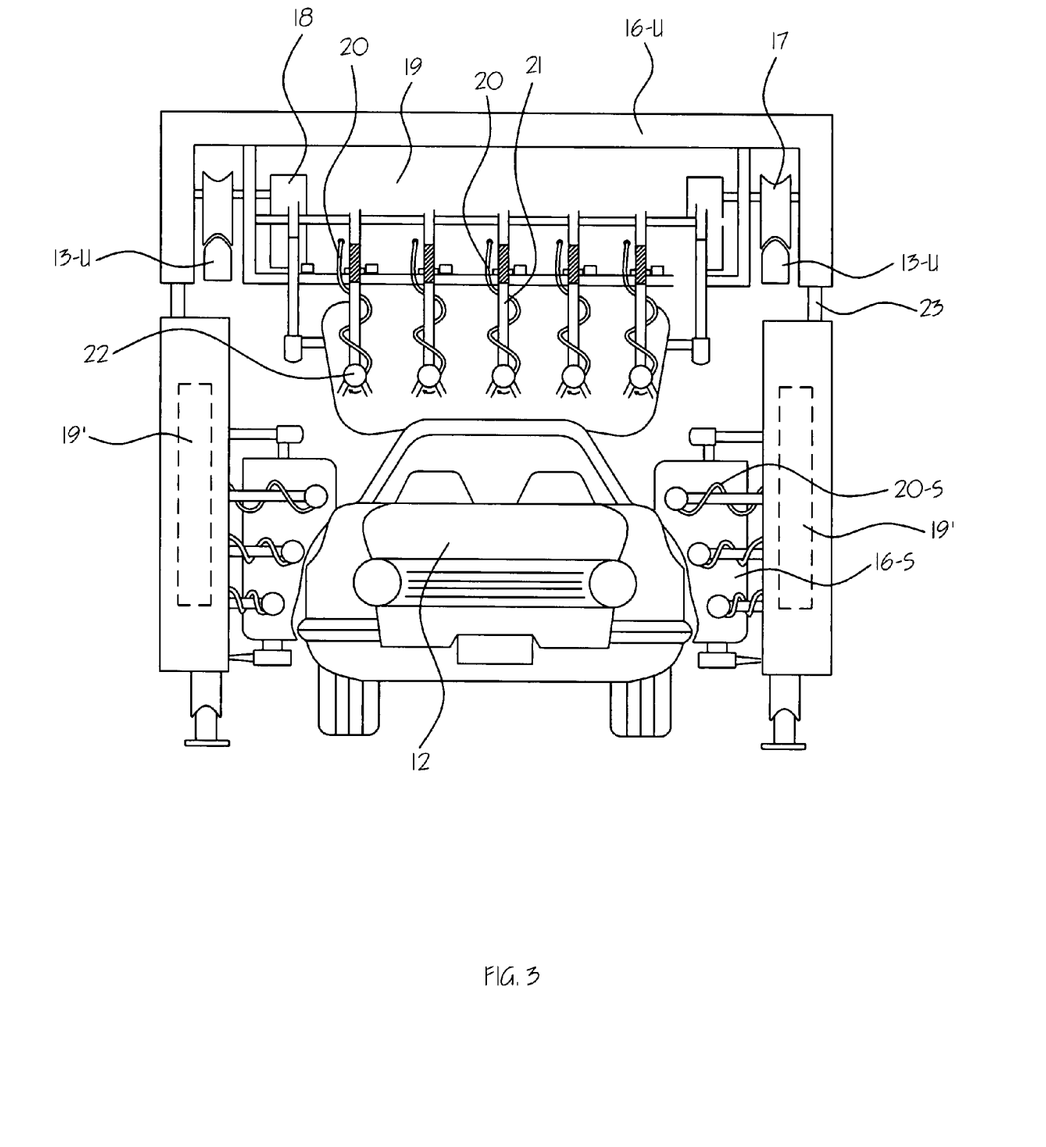
FIG. 3 is a cross-sectional rear view of the no water spill automatic steam car wash system according to current application seen along the line A-A' in FIG. 2.

FIG. 3 is a cross-sectional rear view of the no water spill automatic steam car wash system (11) according to current application seen along the line A-A' in FIG. 2. The moving station (16) has an upper portion (16-U) and two side portions (16-S). The upper portion (16-U) of the moving station (16) is mounted on two long beams (13-U) that constitute the upper face of the frame. Wheels (17), which are rotatably connected to the shaft of a motor (18), which is installed inside of the upper portion (16-U), and engaged to the long beams (13-U), enables the upper portion (16-U) to move along the length of the car (12). Such structure is common for most of prior arts and therefore out of the scope of current invention.

A steam generator (19) that can produce steam of 7 to 10 Kg/cm$^2$ pressure at a rate of 50 to 100 Kg/hr. Multiple of small steam generators can be used to produce such amount of steam. Source of water heating material includes but not limited to gasoline, natural gas, and electricity. A type of steam generator is out of the scope of the current invention. Pluralities of flexible steam hoses (20) are connected from the steam generator (19). Each steam hose (20) surrounds a height adjusting supporting rod (21) and is connected to an oscillating steam spraying nozzle (22).

Figure 4A:
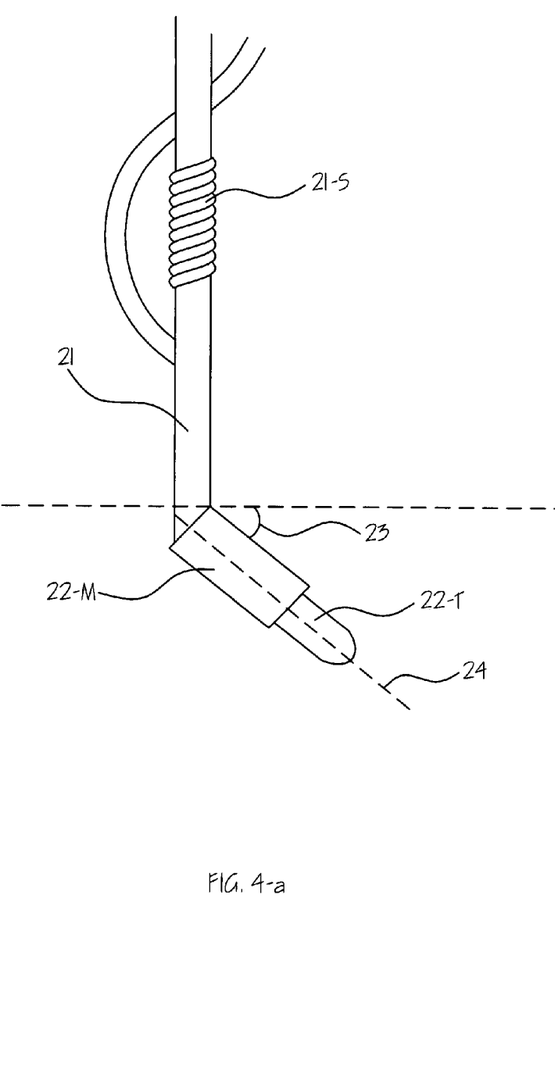
Figure 4B:
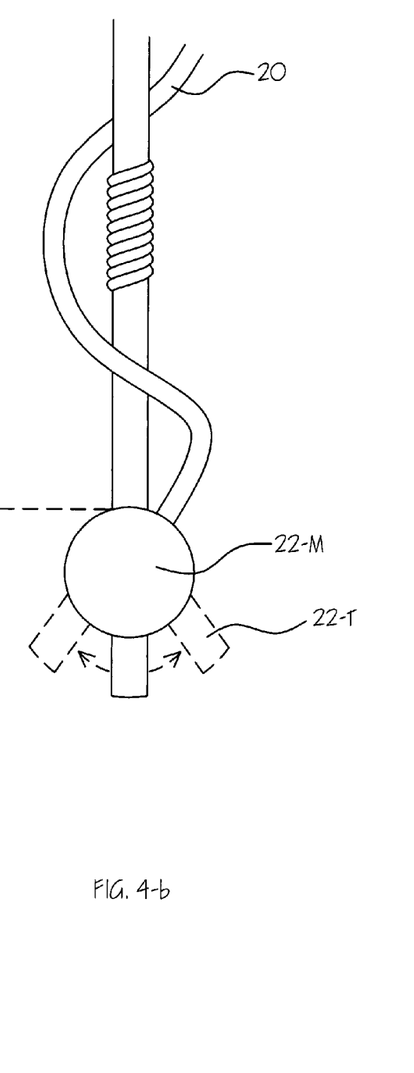

FIG. 4-a is a side view of the oscillating steam spraying nozzle (22) and its' height adjustable supporting rod (21) for the no water spill automatic steam car wash system (11) according to current application. And FIG. 4-b is a front view thereof. The height adjustable supporting rod (21) has a screw (21-S) at the upper portion thereof. One flexible steam hose (20) twines around the supporting rod (21) and is connected to a main body (22-M) of the steam spraying nozzle (22). The nozzle (22) is welded to the lower end of the height adjustable supporting rod (21) with an angle (23). This is to reduce the steam pressure that is applied to the surface of the car while maintain the temperature of the steam. The oscillating tip (22-T) of the steam nozzle (22) oscillates along a hypothetical plane (24) that is parallel to the main body (22-M) of the nozzle (22).

Figure 5:
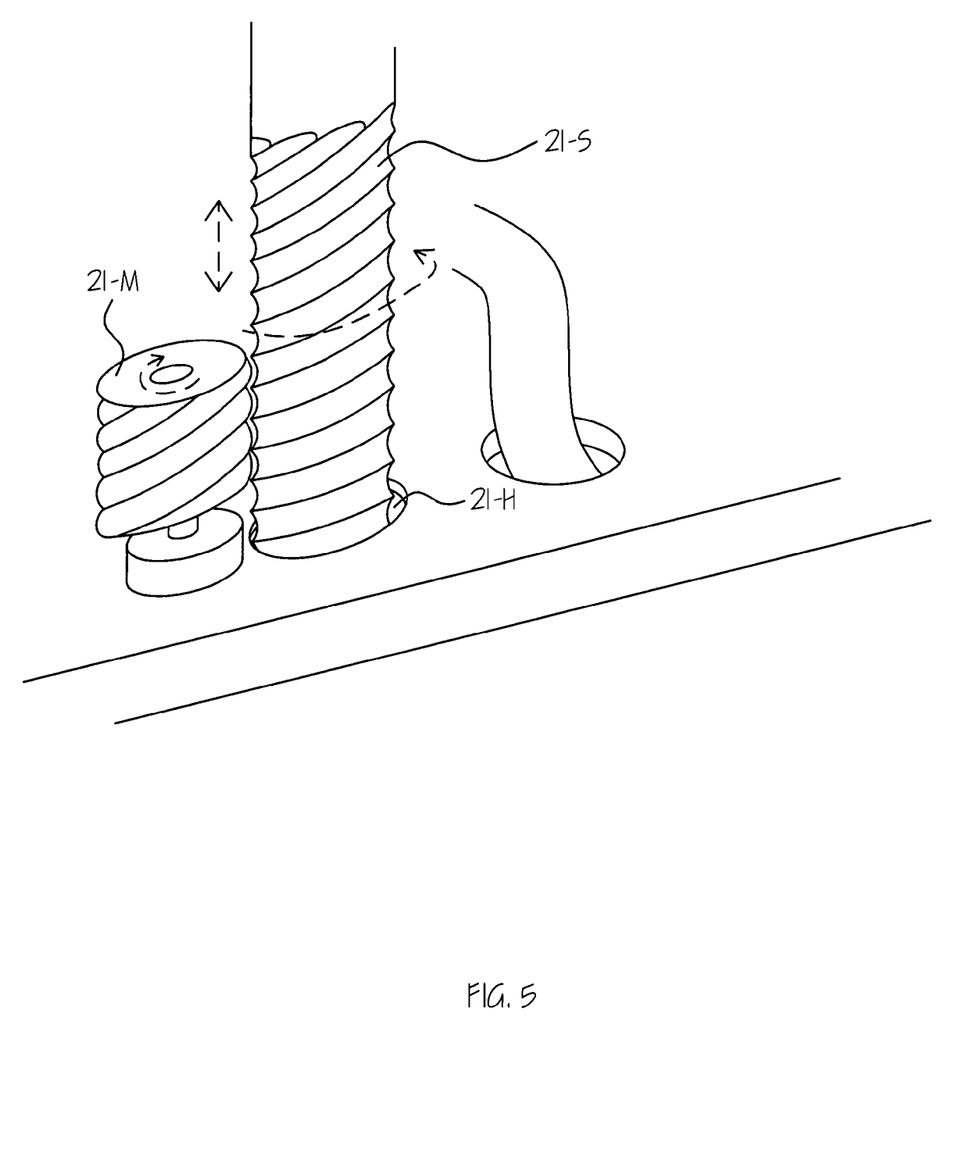
FIG. 5 is a schematic drawing of screwed portion of the height adjustable supporting rod for steam spraying nozzle and worm gear to adjust height of the supporting rod.

FIG. 5 is a schematic drawing of screwed portion (21-S) of the height adjustable supporting rod (21) for the steam spraying nozzle installed in the upper portion (16-U) of the moving station (16). Per one of the supporting rod (21), one worm gear motor (21-M), one supporting rod hole (21-H), and one steam hose hole (20-H) are provided on the bottom of the upper portion (16-U). The worm gear motor (21-M) and the screw (21-S), which is developed at the upper portion of the height adjustable supporting rod (21), are engaged each other. The worm gear motor (21-M) is connected to power line and a central control system (not shown in the figure). When the worm gear motor (21-M) turns, the screw (21-S) turns anticlockwise. As a result, the height adjustable supporting rod (21) goes up. Each worm gear motor (21-M) is separately controlled by a central control system. Therefore, the distance between any surface of the car (12) and the tip (22-T) of the steam nozzle (22) is maintained constant irrespective of the apparent shape of the car (12) as shown in the FIG. 3. Same structure of supporting rod (21), worm gear motor (21-M), supporting rod hole (21-H), steam spraying nozzle (22), steam hose (20), and steam hose hole (20-H) are installed horizontally in the side portions (16-S) of the moving station (16) to allow the nozzles (22) approach the side surface of the car (12). Another steam generators (19') may be installed inside of the side portions (16-S) of the moving station (16), If there are no additional steam generators in the side portions (16-S), the steam nozzles (22-S) on the side portions (16-S) of the moving station is connected to the steam generator (19), which is installed in the upper portion (16-U) of the moving station (16) via connecting channel (23) that connects the upper portion (16-U) and side portions (16-S) of the moving station.

Figure 6:
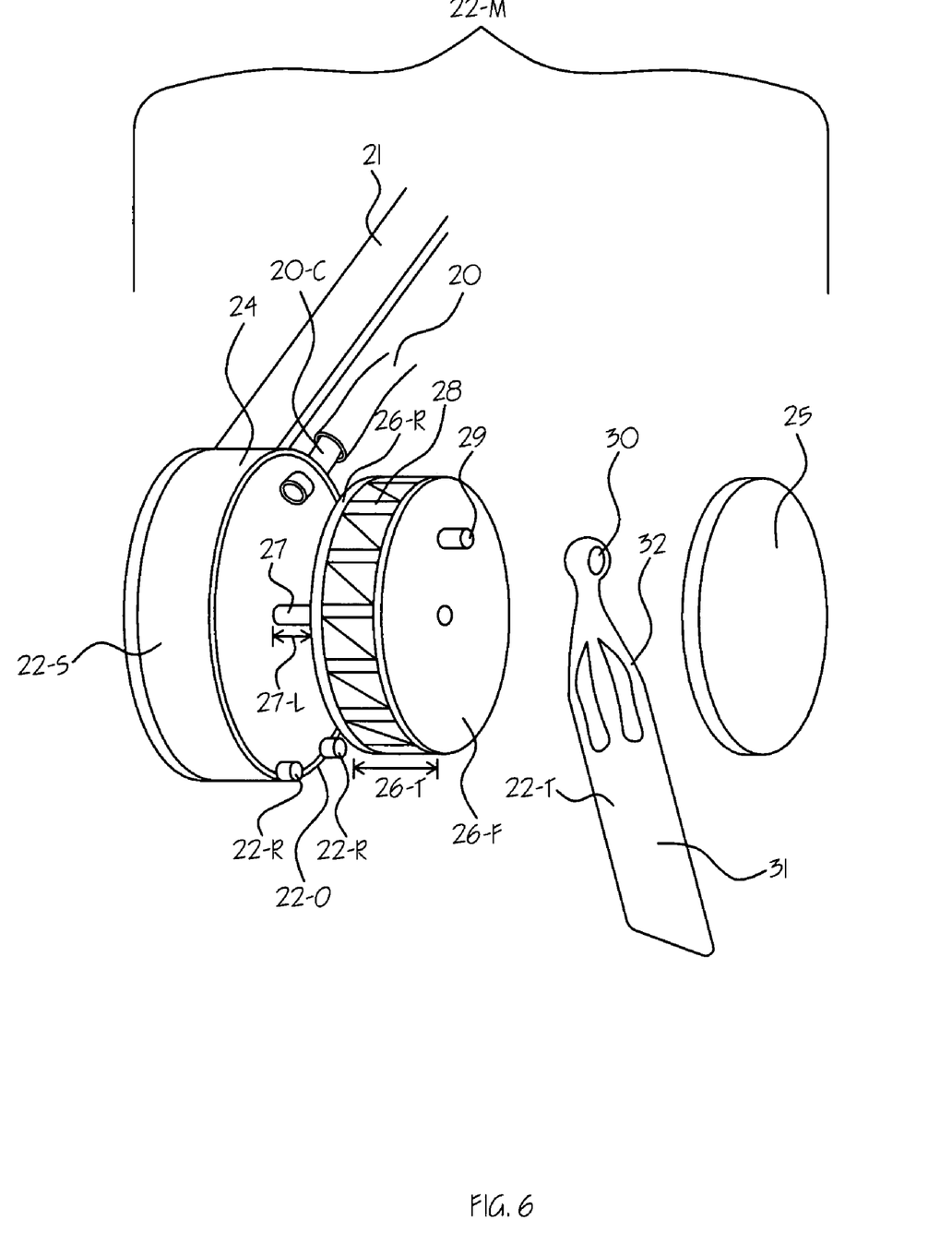
FIG. 6 is an exploded perspective view of the oscillating steam spraying nozzle.

FIG. 6 is an exploded perspective view of the oscillating steam spraying nozzle (22). The steam spraying nozzle (22) is comprised of a main body (22-M) and an oscillating tip (22-T). The main body (22-M) is again comprised of a case (24), a cover (25), and a wind wheel (26). The case (24) has a shape of a shallow cylindrical can when covered with the cover (25). The case (24) is welded to the supporting rod (21) on the side wall (22-S) with an angle (23). A connecting tube (20-C) is welded through the side wall (22-S) next to the point to where the supporting rod (21) is welded. A steam hose (20) is connected to the connecting tube (22-C) to introduce steam into the main body (22-M) of the spraying nozzle (22). On the opposite side, from the side where the supporting rod (21) is welded, a square opening (22-O) is developed on the side wall (22-S) for the oscillating tip (22-T). The wind wheel (26) is rotatably fixed to the center of inside of the case (24) via a rotating pin (27). Length (27-L) of the rotating pin (27) is shorter than the thickness (26-T) of the wind wheel (26). The oscillating tip (22-T) is rotatably connected to the wind wheel (26) via second rotating pin (29), which is found on the front face (26-F) of the wind wheel (26), on a position apart from the center of the wheel (26). The oscillating tip (22-T) is comprised of two sections of rotating ear (30) and spraying tube (31). A hole is developed at one end of the rotating ear (30) to rotatably engage the spraying tube (31) to the rotating pin (29). The rotating ear (30) is welded to the spraying tube (31) by four narrow metal strip (32) form a space through which the steam passes. Length of the oscillating tip (22-T) is longer than the diameter of the main body (22-M). Therefore, one end of the tip (22-T) is always exposed out of the main body (22-M) through the square opening (22-O). Two small rollers (22-R) may be installed at both side of the opening. The supporting rod (21) and parts comprising main body (22-M) of the nozzle are all made of stainless steel.

Figure 7:
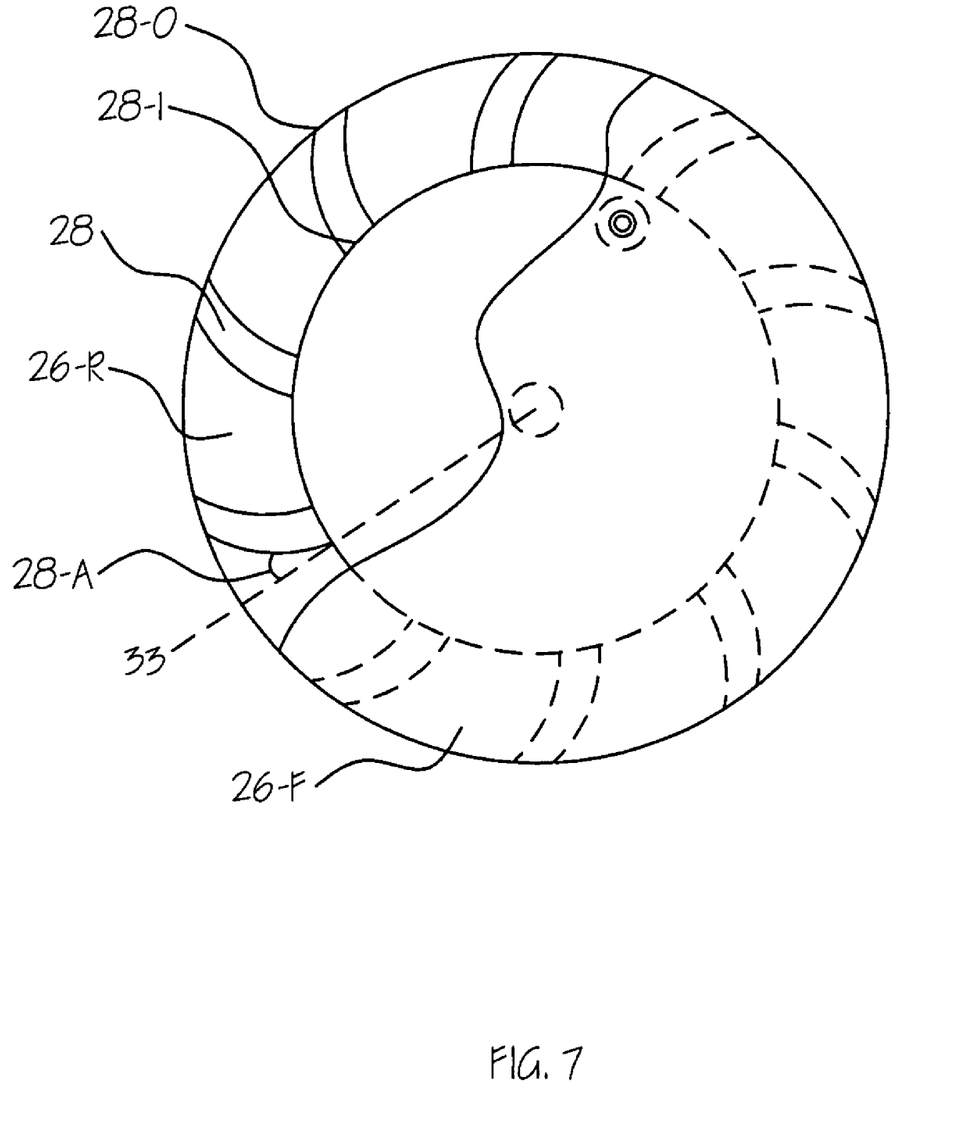
FIG. 7 is a cross-sectional front view of a wind wheel.

FIG. 7 is a cross-sectional front view of a wind wheel (26). The wind wheel (26) has pluralities of blades (28) between circular front face (26-F) and circular rear face (26-R) of the wind wheel (26). The blades (28) are welded to the radial line (33) of the wind wheel (26) with an angle (28-A). One end (28-O) of the blades (28) reach the outer circumference of the wheel (26) and the other end (28-I) of the blades (28) are welded to a center portion (26-C) of the wind wheel (26). Diameter of the center portion (26-C) is smaller than the diameter of the wind wheel (26).

Figure 8:
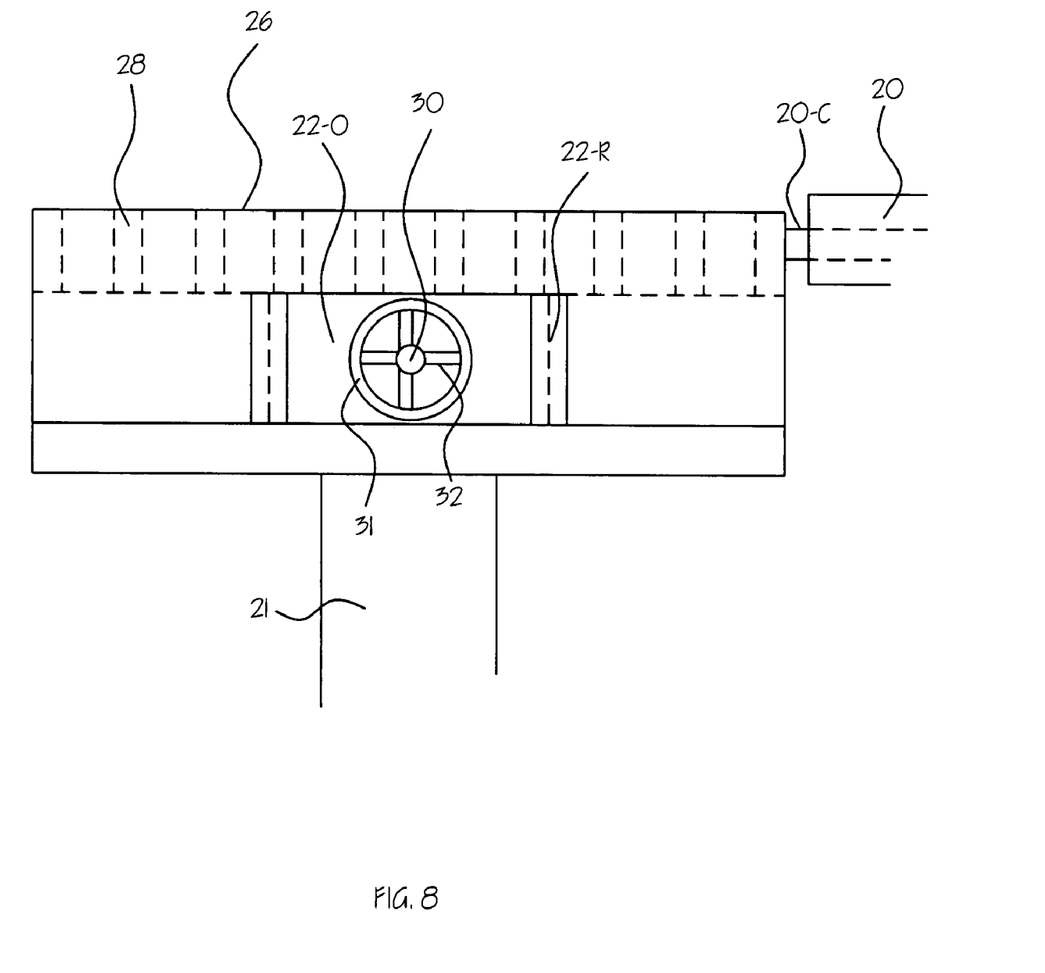
FIG. 8 is a bottom view of the oscillating steam spraying nozzle.

FIG. 8 is a bottom view of the oscillating steam spraying nozzle (22) showing the inner structure of the oscillating tip (22-T).

Figure 9:
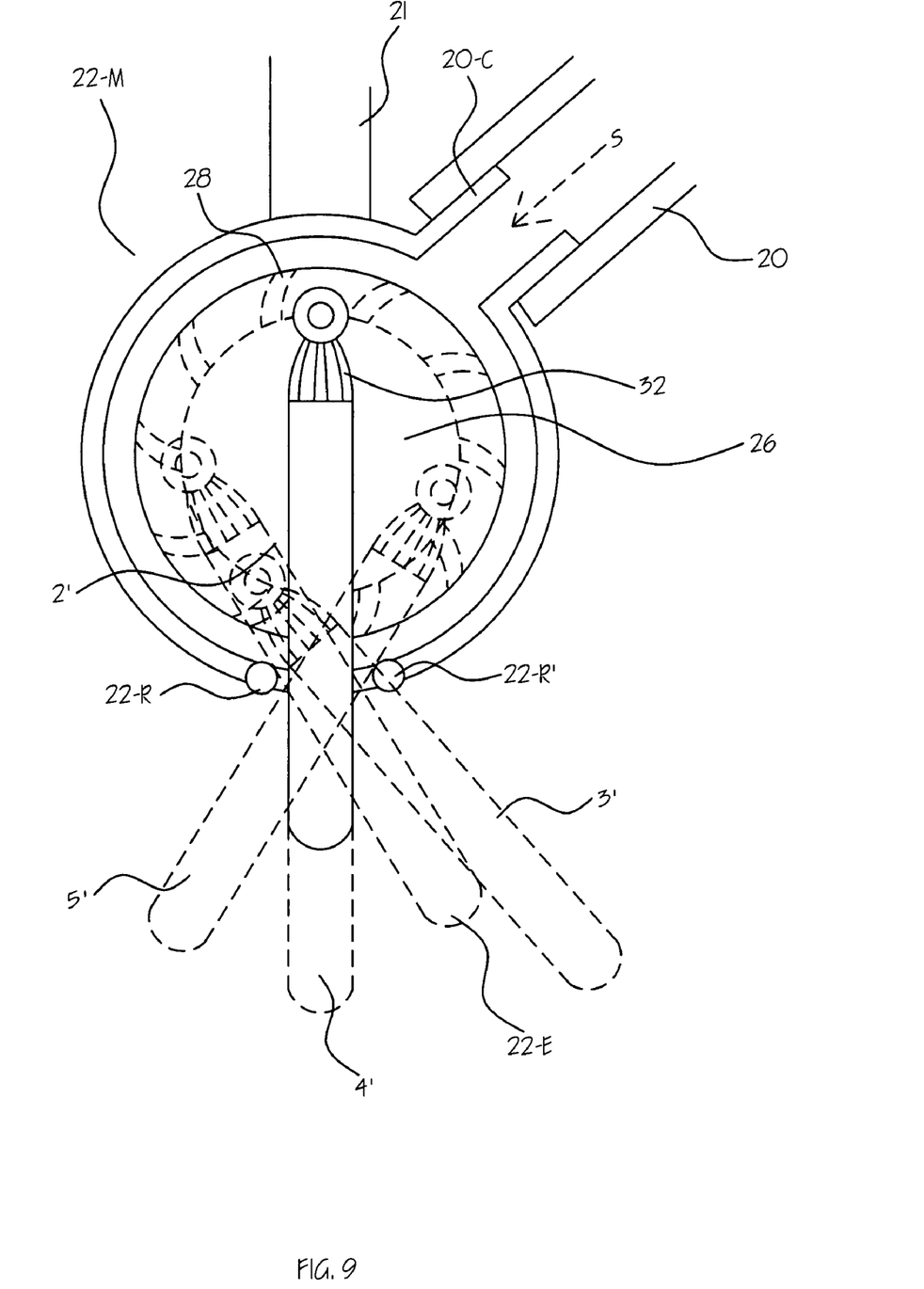
FIG. 9 is a schematic front view of the oscillating steam spraying nozzle showing how the nozzle tip oscillates without any electric motor.

FIG. 9 is a schematic front view of the oscillating steam spraying nozzle (22) showing how the tip (22-T) oscillates without any electric motor. When the high pressure steam (S) is introduced inside of the main body (22-M), the steam (S) pushes blades (28) and makes the wind wheel turn counter-clock wise. Then the second rotating pin (29), welded on the front face (26-F) of the wind wheel (26) also turns counter-clock wise too. Then the rotating ear (30) of the oscillating tip (22-T) moves to left lower side marked as 2' in FIG. 9. At the same time, the other end (22-E) of the tip (22-T) moves to lower right side because middle of the oscillating tip (22-T) is slidably supported by a small roller (22-R) located at the left side of the opening (22-O). As the wind wheel (26) turns more to counter-clock wise and reach the position 3', the other end (22-E) of the tip (22-T) moves more right downward. As the rotating ear (30) reaches the bottom of the wind wheel (26), the other end (22-E) of the tip (22-T) points straight downward of the main body (22-M). After that, as the rotating ring (30) moves right upside to 5' in FIG. 9, middle of the tip (22-T) leans on the small roller (22-R') and the other end (22-E) of the tip (22-T) points left side of the main body (22-M). Likewise, the tip (22-T) of the steam spraying nozzle (22) oscillates as far as the steam is introduced to the main body (22-M).

As shown in the FIG. 3, the spraying nozzles are separated each other to adjust the distance from the car (12) surface to the nozzle depending on the shape of the car (12). Such space between the nozzles can be covered by the unique function of the oscillating tip (22-T) of the steam spraying nozzle.

Figure 10:
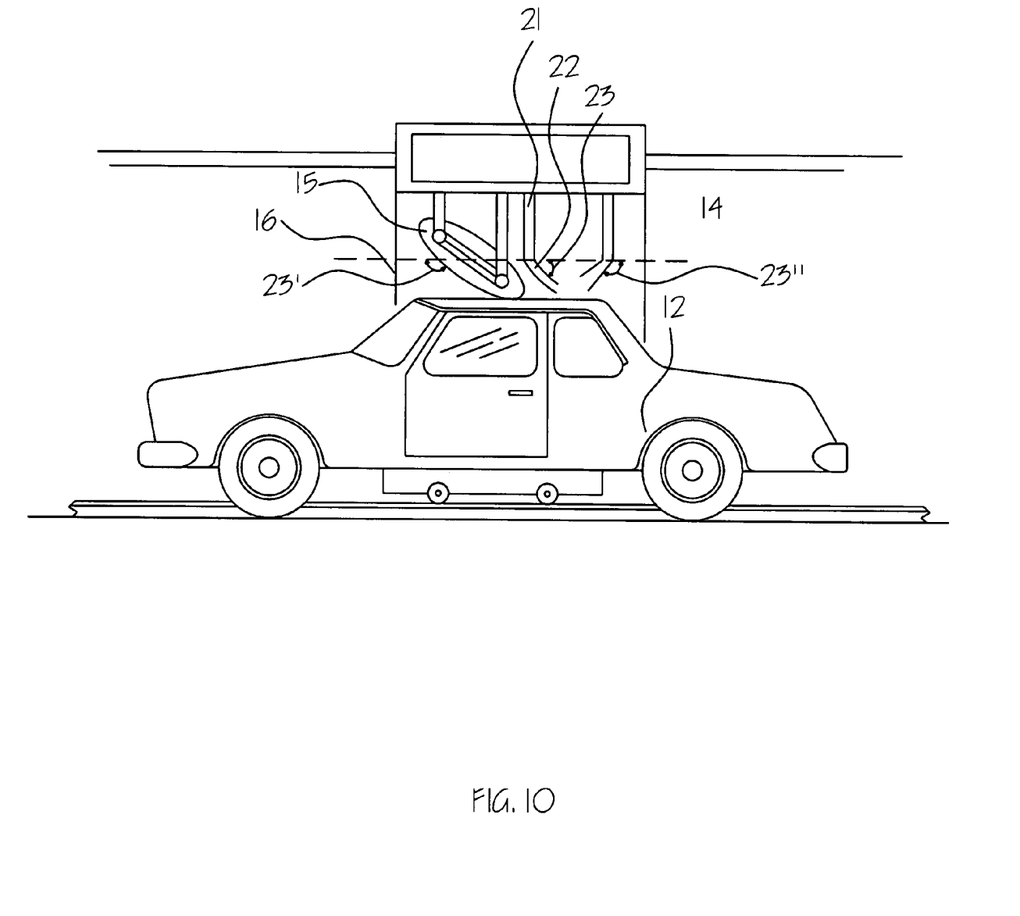
FIG. 10 is a cross-sectional side view of the no water spill automatic steam car wash system according to current application seen along the line B-B' in FIG. 2.

FIG. 10 is a cross-sectional side view of the no water spill automatic steam car wash system (11) according to current application seen along the line B-B' in FIG. 2. Steam spraying nozzle (22), wiping towel (15), and vacuum nozzle (14) are installed in the moving station (16) and moves along the surface of the car (12) to wash it. Those equipments installed in the upper portion (16-U) are shown only. As shown in the FIG. 4-a, the steam spraying nozzle (22) faces the upper surface of the car with an angle (23). And the wiping towel (15) also faces the car upper surface of the car with the same angle (23'). The vacuum nozzle (14) also faces the car (12) with an angle (23") but faces the steam spraying nozzle (22).

Figure 11:
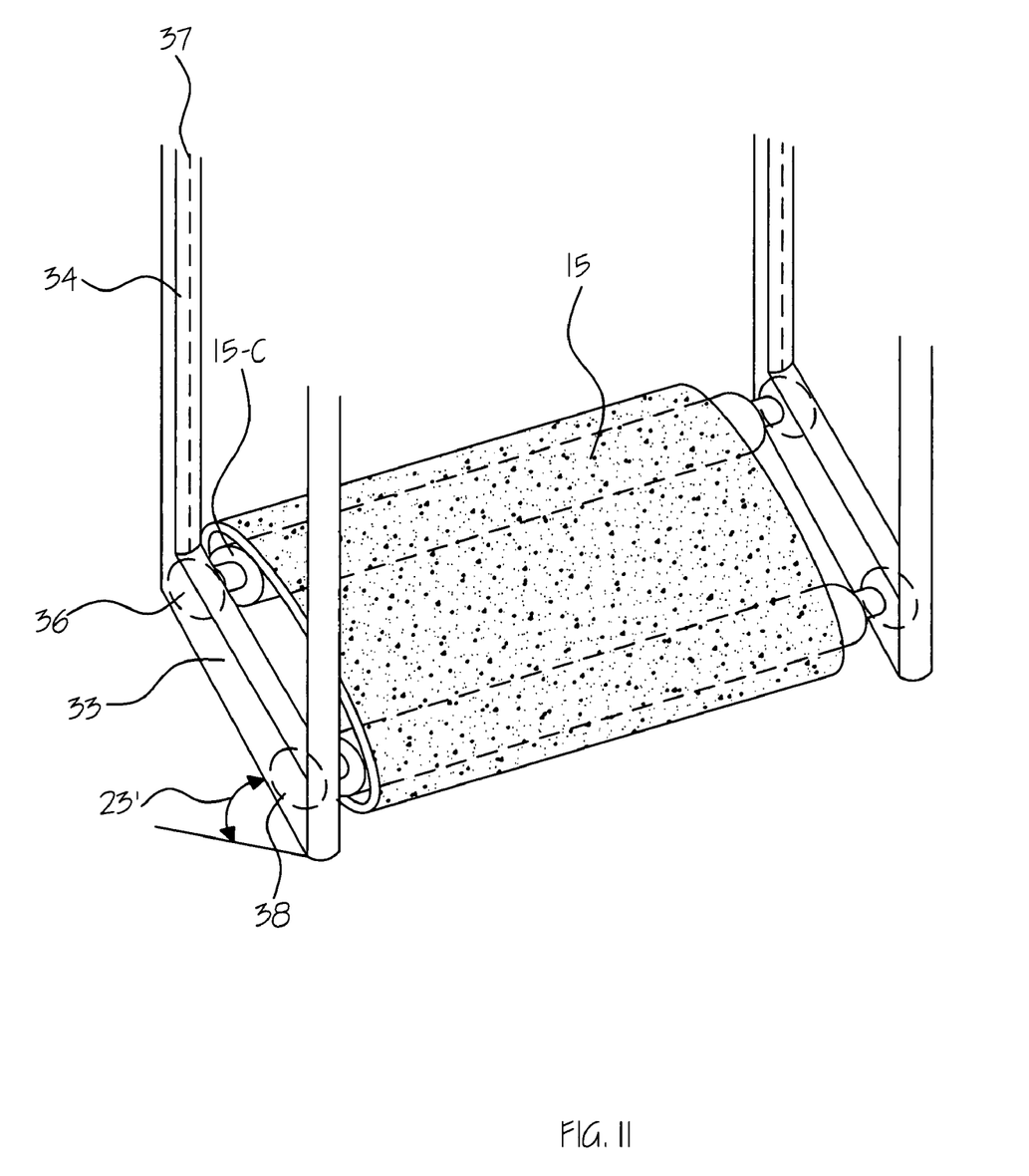
FIG. 11 is a perspective view of a wiping towel for the no water spill automatic steam car wash system according to current application

FIG. 11 is a perspective view of a wiping towel (15) for the no water spill automatic steam car wash system (11) according to current application. The towel is made of micro fiber clothes. It is to minimize scratches induced by the coarse surface of ordinary cotton towel. The towel (15) is made in a cylinder form and applied between two rotating cross bras (15-C). Both ends of the two rotating cross bars (15-C) are connected to two supporting frames (15-S). Each supporting frames (15-S) are comprised of one square pipe (33) and two height adjustable cylindrical pipes (34). Two small electric motors (35) are installed inside of each of the square pipe (33). Each of the electric motor (36) is connected to main power (not shown in the drawing) via electric wires (36) embedded in the cylindrical pipe (34). An electronic pressure sensor (38) is installed on the lower cross bar (15-C-L).

Figure 12:
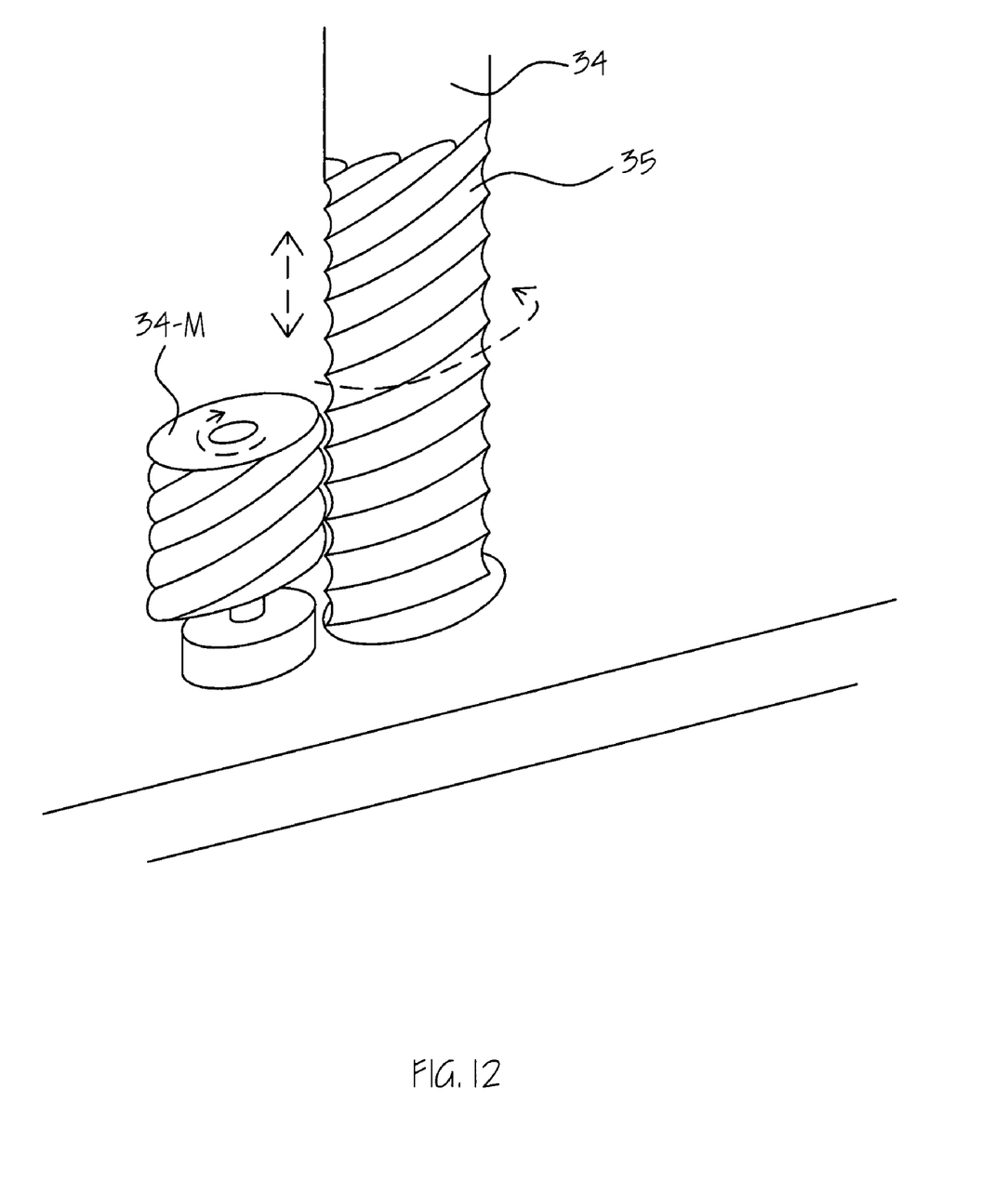
FIG. 12 is a schematic drawing of screwed portion of the height adjustable cylindrical pipe for towel and worm gear to adjust height of the supporting frame.

FIG. 12 is a schematic drawing of screwed portion (35) of the height adjustable cylindrical pipe (34) for towel and worm gear to adjust height of the supporting frame (15-S). As is shown in the FIG. 5, the worm gear (34-M) turns the height adjustable cylindrical pipe (34) goes up and down depends on the turning direction of the worm gear (34-M).

Figure 13:
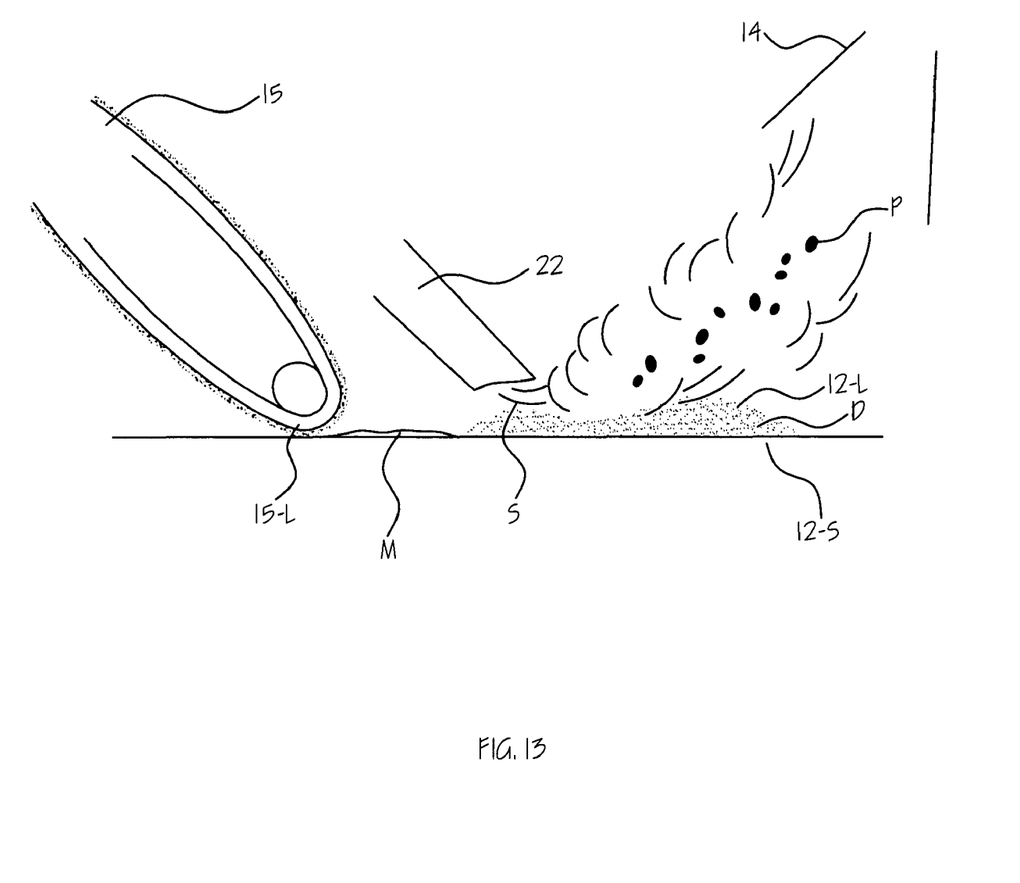
FIG. 13 is a schematic drawing of role of the steam and the wiping towel in steam car wash system according to current application.

FIG. 13 is a schematic drawing of role of the steam (S), the wiping towel (15), and vacuum nozzle (14) in the steam car wash system (1) according to current application.

As a car (12) enters the car wash system (1), the car is in a stationary motion while the moving station (16) proceeds from front side to the rear side of the car. Surface (12-S) of the car (12) is covered with a dusted layer (12-L). The dusted layer (12-L) is usually comprised of dust particles (P) (most of them are inorganic particles of diameter of micrometers), dispersion medium (D) (water moisture or organic molecules).

When the hot steam (S) comes out from the oscillating steam spraying nozzle (22), the hot temperature and moisture of the steam lowers the viscosity of the dispersion medium (D) of the dusted layer (12-L). Then the dusted layer (12-L) becomes less sticky and easily flows. At the same time, the pressure of the steam (s) blows away the dust particles (P) with the dispersion medium (D) to the front direction, where the vacuum nozzle (14) sucks them.

Just after the steam (S) blows away the dusted layer (12-L), the moisture (M) that came from the steam (S) covers the surface of (12-S) of the car (12). Then the wiping towel (15) removes the moisture (M) from the surface layer (12-S).

This sequence of washing is quite different from the prior art. In most of the prior art the dust particles (P) stays on the surface (12-S) of the car while some mop or brush scrubs the surface with the particles (P) and soap water. That makes scratches on the surface of the car.

According to the current application, all the dust particles (P) are blown away by the steam (S) and collected by the vacuum nozzle (14). Therefore, the chance of the dust particle (P) re-deposited on the surface of the car (12) is eliminated. Only the water droplets are left on the surface and wiped away by the towel (15).

The oscillating steam spraying nozzle (22) is welded to the vertically installed height adjustable supporting rod (21) with an angle (23) to make the steam (S) blow away the dirt surface layer (12-L) in one direction and the vacuum nozzle (14) is installed to face the steam nozzle (22) to collect the blown dust particles (P) and prevent the dust particles from re-deposit on the car's surface (12-S). The angle (23) between the steam spraying nozzle (22) and the vertically installed height adjustable supporting rod (21) can be adjusted from 0 to 90 degrees, more specifically 15 to 85 degrees. Meanwhile the distance (30) between tip of the oscillating tip (22-T) and the surface (12-S) of the car is maintained shorter than 5 cm irrespective of the geometry of the surface (12-S) of the car. The distance is maintained regardless of the geometry of the surface (12-S) by moving each of the height adjustable supporting rods (21) according to the geometry.

The wiping towel (15) also maintains angle (23') to the car's surface. But, there is no gap between the lower end (15-L) of the wiping towel (15) and surface (12-S) of the car. Instead a slight pressure is applied to wipe out the moisture. The pressure applied to the towel is measure by the electronic pressure sensor (38). Maximum pressure applied to the towel (15) is less than 1 Kg/cm$^2$. The towel (15) for the steam car wash system (1) according to current application turns very slowly to simulate hand wiping. Maximum turning speed is less than 60 rounds per minute.

The steam car wash system according to current application accomplishes a no water spill automatic car washing system. It not only saves water, but also protects the air by collecting the dusts that comes out from the contaminated car surface. By making a steam car wash system automatic, it also protects workers from contaminated working environment. In addition to this, no detergent is used.

What is claimed is:

1. An automatic steam car washing system to realize a no water spill automatic car washing system and protects the air by collecting the dusts that comes out from the contaminated car surface by using steam is comprised of:

a moving station which has
        an upper portion that is mounted on two long beams that constitute the upper face of the frame and moves along the length of a car with the aid of wheels, which are rotatably connected to the shaft of a motor that is installed inside thereof and engaged to the long beams,
    and
        two side portions, and
pluralities of steam spraying nozzles, each of which is comprised of
a main body that is again comprised of
a case that is welded to a supporting rod on a side wall with an angle and is welded to a connecting tube through the side wall thereof next to the point to where the supporting rod is welded and has a square opening on the opposite side, from the side where the supporting rod is welded for an oscillating tip,
and
a cover,
and
a wind wheel that is rotatably fixed to the center of inside of the case via a rotating pin, of which the length is shorter than the thickness of the wind wheel,
and
has pluralities of blades that are welded to the radial line of the wind wheel with an angle between circular front face and circular rear face there of,
and
an oscillating tip that is comprised of two sections of a rotating ear, which has a hole that is developed at one end thereof to rotatably engage a spraying tube to the rotating pin,
and
a spraying tube that is welded to the rotating ear by four narrow metal strip to form a space through which the steam passes,
and
is rotatably connected to the wind wheel via second rotating pin, which is on the front face of the wind wheel, on a position apart from the center of the wheel,
and oscillates horizontally with an angle to the surface of a car to be washed,
and
pluralities of height adjusting supporting rods, each of which has a screw at the upper portion thereof and is welded to the steam spraying nozzle at the lower end thereof with an angle,
and
pluralities of worm gear motors, each of which are engaged to the screw of the height supporting screw and is connected to power line and a central control system,
and
a vacuum nozzle that faces the car at an angle to the horizontal but faces the steam spraying nozzle,
and
a wiping towel that presses the surface of a car at an angle to the horizontal but has no gap and rotates 60 rounds per minute,
and
pluralities of steam generators, each of which can produce steam of 10 $Kg/cm^2$ pressure at a rate of 100 Kg/hr each of them are installed inside of the moving station and connected to each of the steam spraying nozzles by a flexible steam hose that surrounds the height adjusting rods,
and
a frame that is comprised of 10 metal beams, in which a car to be washed stays inside thereof the flame and front, rear, left and right side of which are covered with transparent blade curtains to monitor the inside thereof,
and wherein the steam spraying nozzle, the wiping towel, and the vacuum nozzle are installed in the moving station and move along the surface of the war to wash it.

2. An automatic steam car washing system of claim 1, wherein; the towel is made of micro fiber clothes in a cylinder form and applied between two rotating cross bars, both ends of which are connected to two supporting frames, each of them are comprised of one square pipe and two height adjustable cylindrical pipes, and two small electric motors are installed inside of each of the square pipe and is connected to main power via electric wires embedded in the cylindrical pipe and an electronic pressure sensor that is installed on the lower cross bar.

* * * * *